United States Patent
Yue et al.

(10) Patent No.: US 6,841,992 B2
(45) Date of Patent: Jan. 11, 2005

(54) MEMS ENHANCED CAPACITIVE PICK-OFF AND ELECTROSTATIC REBALANCE ELECTRODE PLACEMENT

(75) Inventors: Aiwu Yue, Seattle, WA (US); Ronald B. Leonardson, Redmond, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/368,160

(22) Filed: Feb. 18, 2003

(65) Prior Publication Data

US 2004/0160232 A1 Aug. 19, 2004

(51) Int. Cl.$^7$ .......................... G01P 3/42; G01P 15/125
(52) U.S. Cl. ..................... 324/162; 73/514.32
(58) Field of Search ................. 324/162, 160, 324/519, 658, 660–661; 73/514.32, 514.01, 514.02, 1.38, 1.37, 488

(56) References Cited

U.S. PATENT DOCUMENTS 5,719,336 A * 2/1998 Ando et al. .............. 73/514.32
6,167,757 B1 * 1/2001 Yazdi et al. .............. 73/514.32
6,199,874 B1 * 3/2001 Galvin et al. ............. 280/5.514

* cited by examiner

Primary Examiner—Anjan Deb
Assistant Examiner—Amy He
(74) Attorney, Agent, or Firm—Charles J. Rupnick (57) ABSTRACT

A Micro Electro-Mechanical System (MEMS) acceleration sensing device, formed of a sensing element having first and second substantially planar and parallel spaced apart opposing surfaces and being suspended for pendulous motion about a hinge axis oriented along a minor axis of the sensing element; and one or more substrates each having a face spaced from one of the opposing surfaces of the sensing element, each of the substrates having pluralities of electrodes arranged substantially crosswise to the hinge axis of the sensing element symmetrically to a longitudinal axis of the sensing device and forming respective first and second capacitors with the moveable sensing element. Each of the one or more substrates optionally including a clearance relief for extending the rotational range of motion of the sensing element.

27 Claims, 4 Drawing Sheets

MEMS ENHANCED CAPACITIVE PICK-OFF AND ELECTROSTATIC REBALANCE ELECTRODE PLACEMENT

FIELD OF THE INVENTION

The present invention relates to Micro Electro-Mechanical System (MEMS) sensor devices and methods, and in particular to accelerometer sensor devices and methods based on capacitive pick-off and electrostatic rebalance.

BACKGROUND OF THE INVENTION

Micro Electro-Mechanical System (MEMS) sensor devices, including accelerometers, based on capacitive pick-off and electrostatic closed-loop rebalance are generally well known.

Figure 1:
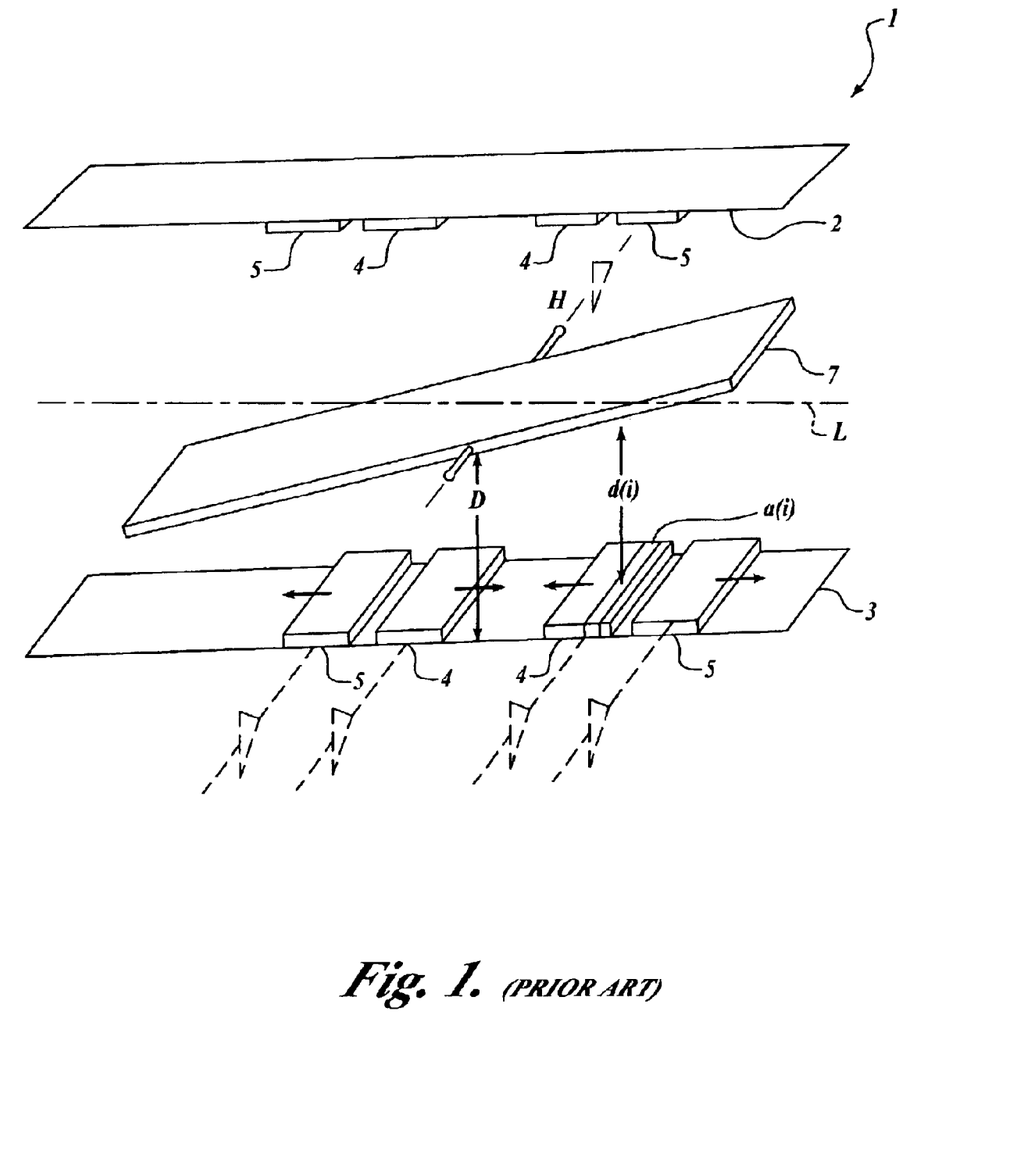
FIG. 1 is an exploded pictorial side view of a capacitive acceleration sensing device of the prior art that illustrates the typical arrangement of capacitor plates in conventional pendulous accelerometer devices.

FIG. 1 illustrates in accordance with prior art, a capacitive pick-off MEMS sensor constructed as a conventional mid-pendulum hinged or "teeter-totter" type. Such devices are constructed using microcircuit techniques to produce reliable, maintenance-free capacitive acceleration-sensing devices. Such a capacitive acceleration sensing device 1, hereinafter a capacitive accelerometer, includes a pair of stationary substrates 2, 3 having opposed parallel planar faces. The substrates 2, 3 are spaced from one another and each has a number of metal electrode layers 4, 5 of predetermined configuration deposited on one surface to form respective capacitor electrodes or "plates." The electrode elements 4 (or 5) operates as an excitation electrode to receive stimulating signals, and the other electrode elements 5 (or 4) operate as the feedback electrodes for electrostatic rebalance. A single set of electrode elements 4 (or 5) operates as both excitation and feedback electrodes when the feedback signal is superimposed on the excitation signal.

A pendulous acceleration sensing element 7, which operates as pick-off electrode, is flexibly suspended for pendulous rotation about a hinge axis H to form different sets of capacitors with electrode elements 4, 5. Movement of the acceleration-sensing element, or "pendulum," 7 in response to acceleration changes its position relative to the stationary excitation electrodes 4 (or 5), thereby causing a change in pick-off capacitance. This change in pick-off capacitance is indicative of acceleration. A set of capacitors for electrostatic rebalance is made up of the sensing element 7 and the feedback electrodes 5 (or 4) for driving the sensing element 7 to its reference position and maintaining it there.

In such an acceleration sensor device, a capacitance formed by the excitation electrodes 4 (or 5) and the moveable sensing element 7 is related to 1/D, where D is the separation from stationary substrates 2, 3 to the hinge axis (H) of the pendulous acceleration sensing element 7.

A desirable characteristic of an accelerometer is a linear response for pick-off capacitance C versus acceleration input g. However, conventional MEMS high-g range accelerometers have less than optimum linearity for high performance application and may also have a non-monotonic response for electrostatic rebalance force versus acceleration when feedback voltage is capped. The capacitance seen by the pick-off electrodes is related to the integral of 1/d(i) for each a(i) over the area of the excitation electrodes, where d(i) is the dynamic separation distance between the stationary electrodes and the pendulum for each incremental area a(i). The sensor's dynamic range, scale factor and response linearity are thus defined by the separation distance D (shown in FIG 1) between the stationary electrode elements 4, 5 and the hinge axis of the pendulous acceleration-sensing element 7, and the positions of electrode elements 4, 5 relative to the hinge axis of the pendulous acceleration-sensing element 7. In a conventional MEMS teeter-totter type acceleration sensor device, the stationary capacitor electrodes 4, 5 are traditionally arranged substantially along a longitudinal axis of symmetry L of the acceleration sensing device 1 perpendicular to the hinge axis H of the acceleration-sensing element 7, as illustrated in FIG 1. Electrode elements 4, 5 are sized and spaced symmetrically with respect to the longitudinal axis L of the acceleration sensing device 1, while the electrode elements 4 (or 5) operating as excitation electrodes are further sized and spaced symmetrically with respect to the hinge axis H of the moveable sensing element 7. Therefore, adjustments of the positions and expansion of the areas of electrode elements 4 and 5 are limited to be in the directions indicated by the arrows in FIG. 1. Area and position adjustment of electrode elements 4 in reverse direction can not be accomplished without affecting electrode elements 5, and vice versa. In other words, because the electrode elements 4 and 5 cannot occupy the same area of the substrate, adjustment of one of the electrode elements almost always necessitates adjustment of the other electrode element. As a result, improving response performance presents a challenge to the device designer. For example, improved response linearity and scale factor is generally achieved by sacrificing dynamic range.

SUMMARY OF THE INVENTION

A Micro Electro-Mechanical System (MEMS) capacitive acceleration sensor of the invention overcomes limitations of the prior art by providing additional degrees of freedom in positioning and sizing excitation and electrostatic rebalance electrodes. The MEMS capacitive acceleration sensor of the invention is formed of a moveable sensing element suspended for rotation about hinge axis; one or more stationary substrate(s) spaced away from the sensing element; and a plurality of capacitors formed between the sensing element and the substrate crosswise to the hinge axis, a first capacitor being arranged between two or more spaced apart second capacitors, wherein the first and second capacitors are arranged symmetrically about a longitudinal axis of the sensor perpendicular to the hinge axis.

According to another aspect of the invention, the each of the first and second capacitors of the capacitive acceleration sensor include one or more electrode elements positioned on a surface of the substrate facing the sensing element. Furthermore, the plurality of capacitors includes one or more excitation electrodes and one or more feedback electrodes. Optionally, the capacitors includes one or more electrodes on which the feedback signal is superimposed on the excitation signal.

According to another aspect of the invention, the substrate of the capacitive acceleration sensor is formed with first and second surfaces spaced at different distances from the sensing element, wherein the first capacitors are formed by the sensing element and electrodes on the first surface of the substrate, and the second capacitors are formed by the sensing element and electrodes on the second surface of the substrate.

According to another aspect of the invention, the second surfaces are spaced apart on opposite sides of the first surface.

According to another aspect of the invention, the substrate further includes a clearance area corresponding to a portion of the sensing element distal from the pendulous axis, the clearance area being spaced a greater distance from the sensing element than one of the first and second surfaces.

According to another aspect of the invention, the clearance area corresponding to a portion of the sensing element distal from the pendulous axis is spaced a greater distance from the sensing element than both of the first and second surfaces.

According to still another aspect of the invention, the clearance area corresponding to a portion of the sensing element distal from the pendulous axis is spaced substantially the same distance from the sensitive element as a farther spaced of the first and second surfaces.

According to other aspects of the invention, the invention provides a MEMS acceleration-sensing device having a substantially flat sensing element having first and second substantially planar and parallel spaced apart opposing surfaces and being suspended for pendulous motion about a hinge axis oriented in parallel with a shorter axis of the substantially flat sensing element; and one or a pair of substrate plates each having a face spaced from one of the opposing surfaces of the sensing element, each of the substrates having first and second electrodes arranged in elongated patterns oriented substantially crosswise to the hinge axis of the sensing element with the first electrodes being positioned between two or more of the second electrodes, and the first and second electrodes forming respective first and second capacitors with the sensing element.

According to another aspect of the invention, the face of each substrate of the acceleration sensing device further includes a three-dimensional structure having substantially planar and parallel trough and mesa surfaces oriented crosswise to the hinge axis of the sensing element, the trough surface being offset from the mesa surface, and the first and second pluralities of electrodes being arranged respectively on each of the trough and mesa surfaces.

According to another aspect of the invention, the three-dimensional structure of each substrate of the acceleration sensing device further include a pair of substantially coplanar trough surfaces arranged symmetrically on opposite sides of a single mesa surface.

According to another aspect of the invention, the mesa surfaces of each substrate of the acceleration sensing device further include a pair of substantially coplanar mesa surfaces arranged symmetrically on opposite sides of a single trough surface.

According to another aspect of the invention, the face of each substrate of the acceleration sensing device further includes a clearance relief surface positioned opposite from a moveable tip portion of the sensing element remote from the hinge axis, the clearance relief surface being substantially coplanar with and interconnected with the trough surface and sized to clear the moveable tip portion of the sensing element during partial rotation about the pendulous axis.

According to another aspect of the invention, the clearance relief surface formed in the face of each substrate is spaced even more distantly from the surface of the sensing element than the trough and mesa surfaces.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 8, 9 and 10 illustrate different alternative embodiment of the three-dimensional substrate structure of the invention having the inverse or reverse image of the configuration shown in earlier Figures, wherein;

DETAILED DESCRIPTION OF PREFERRED EMBODIMENT

In the Figures, like numerals indicate like elements.

The present invention is an apparatus and method for extending response dynamic range and improving response linearity in reliable, maintenance-free Micro Electro- Mechanical System (MEMS) capacitive acceleration-sensing devices. Accordingly, the invention is embodied as an apparatus and method for providing a quantity of electrodes coupled with a pendulous acceleration-sensing element, the electrodes being arranged substantially crosswise to a rotational or "hinge" axis of the pendulous acceleration-sensing element and symmetrically about the device's longitudinal symmetry axis.

Figure 2:
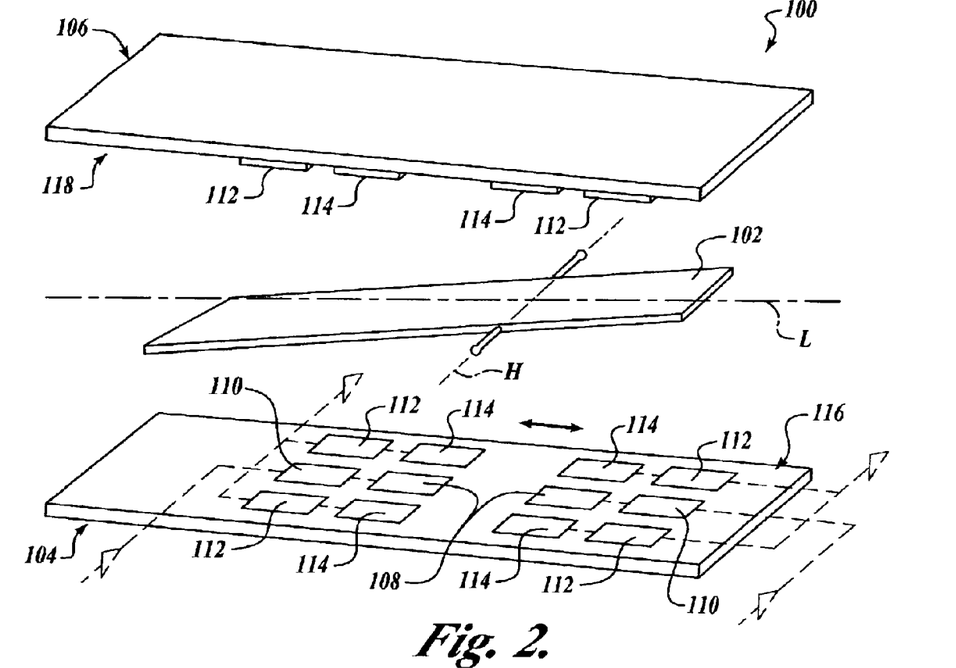
FIG. 2 illustrates the MEMS capacitive acceleration sensing device of the invention embodied as a pendulous acceleration sensing element having electrodes oriented substantially perpendicularly to a hinge axis of a pendulous acceleration-sensing element.

FIG. 2 illustrates the MEMS acceleration-sensing device of the invention as an acceleration-sensing element 100 having an electrically conductive pendulous acceleration-sensing element 102 moveably suspended between spaced apart first and second stationary substrates or "plates" 104, 106.

Electrodes 108, 110, 112 and 114 are positioned on first and second substantially planar and parallel spaced apart opposing stationary substrate plate surfaces 116, 118. The electrodes 108, 110, 112, 114 are each assigned operation as either an excitation electrode or a feedback electrode, or as an excitation-feedback electrode when excitation signals are superimposed on feedback signals. Electrodes of one type (excitation, feedback, or excitation-feedback) are placed singly or in groups centrally or peripherally to electrodes of another type, or are interleaved with electrodes of the other type. The electrodes are arranged symmetrically to a longitudinal axis of symmetry L of the sensor 100, and electrodes assigned operation as excitation electrodes are arranged symmetrically to the hinge axis H of the pendulous acceleration-sensing element 102.

The pick-off capacitance varies by $\Sigma(\ a(i)\ /d(i))$, where $a(i)$=incremental surface area of excitation electrodes and $d(i)$=corresponding separation distance; and electrostatic rebalance force varies by $\Sigma a(i)*(V/d(i))^2$, where V=feedback voltage. The lengthwise orientation of the electrodes perpendicular to the hinge axis H of the sensing element ensures that at least a portion $a(i)$ of the excitation electrodes and feedback electrodes experience identical separation distances $d(i)$.

Recalling FIG. 1 the prior art is seen to permit three degrees of design freedom in designing structures to optimize device output response. The conventional electrode arrangement shown in FIG. 1 permits a first degree of freedom in the ability to vary the separation distance D between the stationary substrate plates and the moveable acceleration-sensing element, a second degree of freedom in the ability to vary the surface area and shape of the electrodes, and a third degree of freedom in positioning electrodes on the substantially planar surface of the substrate. The second and third degrees of freedom are actually limited. Expanding and repositioning the inner electrodes (elements 4) without affecting the outer electrodes (elements 5) can only be practiced in the area between the outer electrodes. By corollary, expanding and repositioning the outer electrodes (elements 5) without affecting the inner electrodes (elements 4) are limited to the area outside the inner electrodes.

The present invention eliminates the limitations imposed by the prior art relative to expansion or repositioning of the electrodes.

Figure 3:
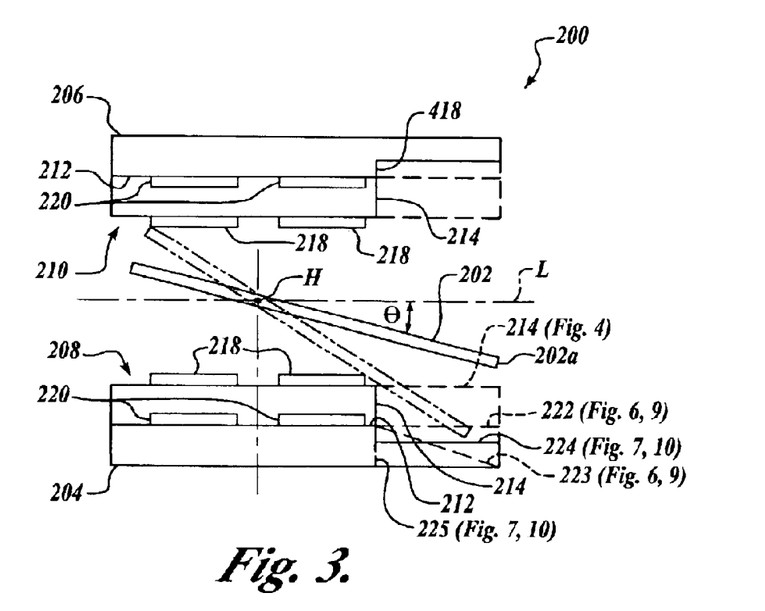
FIG. 3 is an exploded side view of the MEMS capacitive acceleration-sensing device of the invention that is optimized through the electrode positioning described in FIG. 2, and illustrates a quantity of different three-dimensional mesas or trough steps for bearing different electrodes, where the different mesas or trough steps permit setting of different displacement distances for the excitation electrodes, which are used for capacitance pick-off and the feedback electrodes, which are used for electrostatic rebalance.
Figure 4:
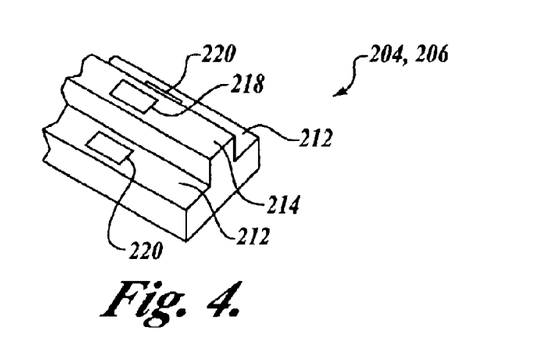
FIG. 4 is a pictorial view of one of the stationary substrates of the MEMS capacitive acceleration sensing device of the invention illustrated in FIG. 3.

Practice of the present invention permits adjustment of either or both of an area and a position of a central bank or group of electrodes 108, 110 independently of an outside bank or group of electrodes 112, 114 in the direction indicated by the double-pointed arrow. Accordingly, both the central and outside banks or groups of electrodes 108, 110 and 112, 114 are adjustable by resizing and repositioning the electrodes independently of one another crosswise to the hinge axis of the sensing element 102 along the longitudinal axis L of the sensor 100. As shown, the areas of the individual electrodes 108, 110, 112, 114 can be contiguous, aligned or staggered to optimize response output performance. FIGS. 3 and 4 illustrate the invention embodied in a MEMS capacitive closed-loop accelerometer device that is optimized through the electrode pad positioning described in FIG. 2. The invention as practiced according to the embodiment of the MEMS device illustrated in FIGS. 3 and 4 additionally optimizes response output performance by forming a quantity of different mesas and troughs, or in combination "steps," in the opposing surfaces of the top and bottom stationary substrate plates for the different types of electrode pads. The different mesas and trough steps permit setting of different displacement distances of the individual electrodes relative to the moveable sensing element independently of one another. As discussed above, the pick-off capacitance is associated with $1/d(i)$, and electrostatic force is associated with $1/(d(i))^2$. Accordingly, the additional quantity of different mesas or trough steps provides a fourth degree of freedom for sensor design that is unknown in the prior art.

FIG. 3 is an exploded side view of a dual sided MEMS acceleration sensing device, and FIG. 4 is a pictorial view of the substrate plates. FIGS. 3 and 4 together illustrate, by example and without limitation, the invention as being embodied in a dual-sided MEMS acceleration sensing device 200 having a conventional teeter-totter type pendulous acceleration-sensing element 202 moveably suspended between opposing spaced apart interior surfaces of first and second stationary substrate plates 204, 206. Each of the substrate plates 204 and 206 includes a respective three-dimensional (3-D) structured surface 208, 210. The 3-D structured surfaces 208, 210 each include a quantity of different steps structured at different heights, i.e, troughs and mesas offset relative to one another and relative to the acceleration-sensing element 202, whereby the different excitation and rebalance electrodes are more or less remotely spaced from the suspended sensing element 202.

Accordingly, each of the substrate plates 204, 206 of the dual sided MEMS acceleration sensing device 200 includes a pair of troughs 212 oriented substantially perpendicularly to the hinge axis H of the pendulous acceleration sensing element 202 and positioned symmetrically on either side of a central mesa 214. The troughs 212 and mesa 214 are symmetrical about the longitudinal axis of symmetry L of the sensor 200. One or more electrodes 218 are arranged on the central mesa 214. One or more electrodes 220 are arranged on the troughs 212 and are thereby offset below and on either side of the electrodes 218.

The different mesa and trough steps for the different types of electrodes thus provide an additional degree of design freedom for controlling the dynamic separation distance d between the stationary electrodes and the moveable sensing element 202 for each different type of electrode element. A suitable combination of electrode areas, their shapes and their separation from the sensing element 202 results in improved device performance.

Figure 5:
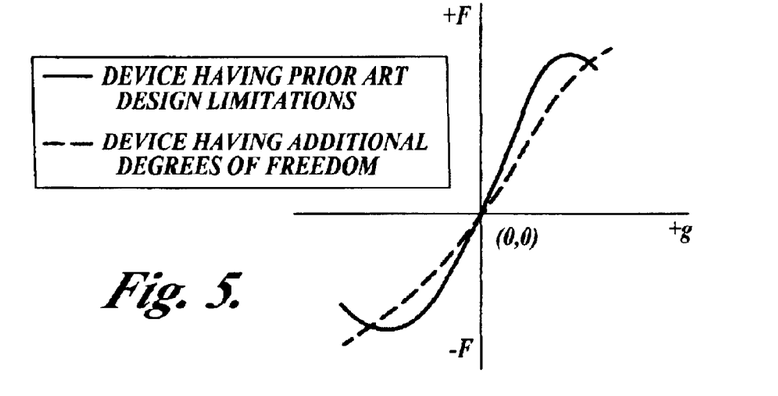
FIG. 5 illustrates the improved closed loop feedback response provided by the invention, whereby the response output of a device according to the invention is more linear over an extended dynamic range than the response output of a device having the limitations of the prior art, and the electrostatic rebalance force F is monotonic over the extended acceleration range with the same feedback voltage limitation.

FIG. 5 illustrates improved closed loop feedback monotonic response provided by the invention over devices having the limitations of the prior art, given the same area of the sensing element and same limit of feedback voltage. In FIG. 5, the electrostatic rebalance force F versus acceleration input "g" is shown in solid for the prior art device practiced with the design limitations described herein. A roughly S-shaped curve results from any one or a combination of the following feedback voltage being capped, the area of feedback electrodes being insufficient; and separation between feedback electrodes and sensing element not being optimized. Improvement of linearity of pick-off response and elimination of the S-shape of the feedback voltage can be achieved in an extended dynamic range with less design challenge, as is illustrated by the more linear response (dashed) that results when the sensor is practiced to offset the earlier described design limitations.

Figure 6:
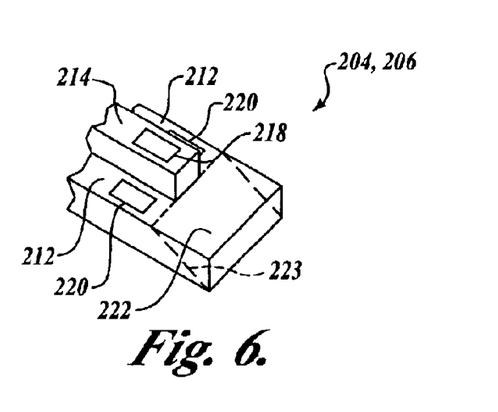
FIG. 6 illustrates an alternative embodiment of the invention having an additional step or trough bridge portion formed in the stationary substrates to correspond to the extreme end of the moveable sensing element.

FIG. 6 illustrates yet another alternative embodiment of the invention, which includes modified orientation of excitation and electrostatic rebalance electrodes described in FIG. 2, as well as the 3-D structured substrate described in FIGS. 3 and 4.

As illustrated in FIG. 3, rotation of the moveable sensing element 202 is limited by its rotational tip portion 202a contacting the interior surfaces of the stationary substrate plates 204, 206. When the substrate plates are structured with only the mesa 214 and troughs 212, as illustrated in FIG. 4, rotation of the sensing element 202 is limited by contact of its extreme edge or tip portion 202a with the central mesas 214 of substrate plates 204 or 206.

FIG. 3 also illustrates the effect of a clearance area on the sensor's open-loop operational range and its velocity storage in closed-loop operation. When the peripheral troughs 212 are extended to the end portion of the mesa area 214, which is truncated beyond the area occupied by electrodes 218, as illustrated in FIG. 6, a substantially planar clearance area 222 is created for the moveable tip portion 202a of the sensing element 202. The clearance area 222 at the end of the mesa 214 permits greater angular rotation of the sensing element 202 so that the rotational angle theta θ of the moveable sensing element 202 is extended. As a result, the sensor's open-loop dynamic range and its closed-loop velocity storage are increased.

Accordingly, in FIG. 6 the invention is embodied in one or both of the stationary substrate plates 204, 206 having a 3-D structure wherein the peripheral electrodes 220 are offset below central electrodes 218 so that the peripheral electrodes 220 are more remotely spaced from the sensing element 202 (shown in FIG. 3) relative to the more closely spaced central electrodes 218.

The invention as embodied in FIG. 6 includes clearance area 222 formed as an additional trough surface in the 3-D structure of the substrate plates 204, 206 at a position corresponding to the tip portion 202a of the rotational sensing element 202. The clearance area 222 is offset below the distal or extreme end of the central mesa 214 and is sized to provide rotational clearance for the tip portion 202a of the rotational sensing element, as illustrated in FIG. 3. According to one embodiment of the invention, the clearance area 222 is merged with trough areas 212 and is substantially coplanar with them.

According to another embodiment of the invention illustrated in FIG. 6, the clearance area 222 is merged with trough areas 212 beyond the end of the truncated central mesa 214 and is optionally formed as an inclined surface 223 slanted away from the electrode surfaces and the rotational sensing element 202, as indicated by the dashed lines.

Figure 7:
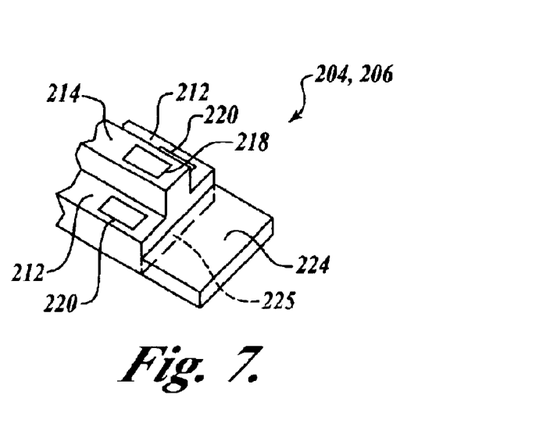
FIG. 7 illustrates another alternative embodiment of the invention having an additional step or trough portion formed in the stationary substrates to correspond to the extreme end of the moveable sensing element.

According to another alternative embodiment of the invention illustrated in FIG. 7, a differently embodied clearance area 224 is formed at a position corresponding to the moveable tip portion 202a of the rotational sensing element 202 and is sized to provide rotational clearance for the tip portion. The clearance area 224 is formed, for example, as an additional step trough surface spaced below the troughs 212 beyond the end of the electrode element 218 where the mesa 214 is truncated.

According to another alternative embodiment illustrated in FIG. 7, the clearance area 224 is expanded to include the entire portion of the substrate 204, 206 beyond the electrode elements 218, 220. Accordingly, the troughs 212 and mesa 214 are truncated beyond the electrode elements so that an end portion the substrates 204, 206 corresponding to the clearance area 224 is completely removed and the substrates 204, 206 end in a truncated surface 225 as indicated by the dashed lines. The rotational angle theta θ of the moveable sensing element 202 is thus expanded to a maximum degree.

Figure 8:
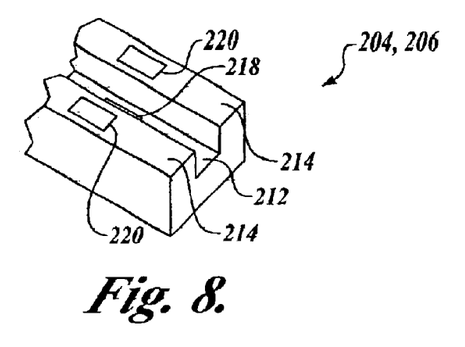
FIG. 8 illustrates the invention as embodied in the stationary substrates each having a pair of mesas arranged symmetrically on either side of a single trough with the trough and mesas being oriented crosswise to a hinge axis of the sensing element shown in FIG. 2 and having electrodes arranged on the different trough and mesa surfaces.
Figure 9:
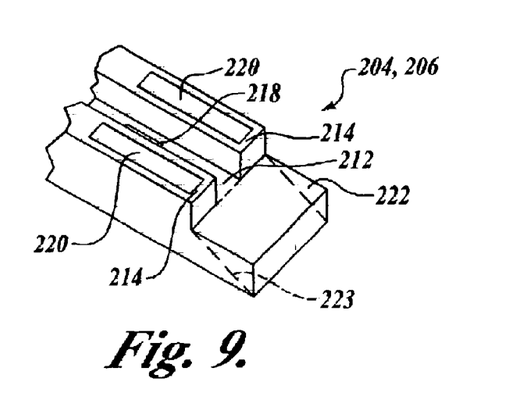
FIG. 9 illustrates the invention embodied in the stationary substrates of FIG. 8 having a clearance area at a position corresponding to the moveable tip of the rotational sensing element shown in FIG. 2 and being sized to provide clearance for motion of the tip of the rotational sensing element.
Figure 10:
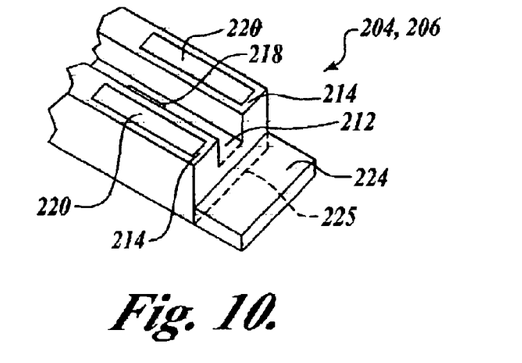
FIG. 10 illustrates the invention as embodied in the stationary substrates of FIG. 8 having a deeper clearance area at a position corresponding to the moveable tip of the rotational sensing element and being sized to provide clearance for motion of the tip portion, whereby rotation of the moveable sensing element is expanded to a maximum degree.

FIGS. 8, 9 and 10, by example and without limitation, illustrate different configurations of the three-dimensional structure of the substrate plates 204, 206 having the inverse or reverse image of the configuration shown in FIGS. 4 and 6, 7. In FIG. 8, a pair of mesas 214 are arranged symmetrically on either side of a single trough 212, the trough 212 and mesas 214 being oriented crosswise to the hinge axis H of the sensing element 202 (shown in FIG. 2). The electrodes 218, 220 are arranged on the different trough and mesa surfaces.

FIG. 9 illustrates the invention as embodied in the substrate plates 204, 206 of FIG. 8 having the clearance area 222 structured as an additional trough surface at a position corresponding to the moveable tip portion 202a of the rotational sensing element 202. The clearance area 222 is offset below the distal or extreme end of the peripheral mesas 214 and is sized to provide rotational clearance for the tip portion 202a of the rotational sensing element, as illustrated in FIG. 3. According to one embodiment of the invention, the clearance area 222 interconnects the central trough portion 212 and is substantially coplanar with it.

According to another embodiment of the invention illustrated in FIG. 9, the clearance area 222 is merged with the single central trough area 212 beyond the end of the truncated dual mesas 214 and is optionally formed as an inclined surface 223 slanted away from the electrode surfaces and the rotational sensing element 202, as indicated by the dashed lines.

FIG. 10 illustrates the invention as embodied in the substrate plates 204, 206 of FIG. 8 having the differently embodied clearance area 224 structured as an additional trough surface at a position corresponding to the moveable tip portion 202a of the rotational sensing element 202 and sized to provide rotational clearance for the tip portion. The clearance area 224 is formed, for example, as an additional step trough surface spaced below the troughs 212 beyond the end of the electrode element 220 where the mesas 214 are truncated.

According to another alternative embodiment illustrated in FIG. 7, the clearance area 224 is expanded to include the entire portion of the substrate 204, 206 beyond the electrode elements 218, 220. Accordingly, the trough 212 and mesas 214 are truncated beyond the electrode elements so that an end portion the substrates 204, 206 corresponding to the clearance area 224 is completely removed and the substrates 204, 206 end in a truncated surface 225 as indicated by the dashed lines. The rotational angle theta θ of the moveable sensing element 202 is thus expanded to a maximum degree.

While the preferred embodiment of the invention has been illustrated and described, it will be appreciated that various changes can be made therein without departing from the spirit and scope of the invention.

What is claimed is:

1. A Micro Electro-Mechanical System (MEMS) sensor, comprising:

a sensing element suspended for motion relative to a rotational axis;

a relatively stationary substrate spaced away from the sensing element; and first and second capacitors formed by the sensing element and the substrate, the first and second capacitors being arranged in a pattern that is oriented substantially crosswise to the rotational axis of the sensing element with at least a portion of the first capacitor being arranged beside at least a portion of the second capacitor along a longitudinal axis of the sensing element that is perpendicular to the rotational axis such that, during rotational excursions of the sensing element both approaching and withdrawing from the stationary substrate, a capacitance formed over a portion of the first capacitor remains substantially identical to a capacitance formed over a portion of the second capacitor.

2. The sensor of claim 1 wherein the first and second capacitors further comprise respective first and second electrodes formed on a surface of the substrate facing the sensing element and the first electrodes being staggered along the longitudinal axis of the sensing element relative to the second electrodes.

3. The sensor of claim 1 wherein each of the first and second capacitors further comprises an electrode assigned for operation as one of an excitation electrode and a feedback electrode.

4. The sensor of claim 1 wherein each of the first and second capacitors further comprises an electrode having a feedback signal superimposed on an excitation signal.

5. The sensor of claim 1 wherein the stationary substrate further comprises first and second surfaces spaced different distances from the sensing element, the first capacitors being formed by the sensing element and the first surface of the substrate, and the second capacitors being formed by the sensing element and the second surface of the substrate.

6. The sensor of claim 5 wherein the first surface further comprises a pair of surfaces spaced apart on opposite sides of the second surface.

7. The sensor of claim 5 wherein the stationary substrate further comprises a clearance area corresponding to a portion of the sensing element distal from the hinge axis, the clearance area being a portion of the substrate surface that is offset from one of the first and second surfaces relative to the sensing element.

8. The sensor of claim 5 wherein the stationary substrate further comprises a clearance area corresponding to a portion of the sensing element distal from the hinge axis, the clearance area being a portion of the substrate surface that is offset from both of the first and second surfaces relative to the sensing element.

9. The sensor of claim 5 wherein the stationary substrate further comprises a clearance area corresponding to a portion of the sensing element distal from the hinge axis, the clearance area being a portion of the substrate surface that is substantially coplanar with one of the first and second surfaces that is spaced farther from the sensitive element.

10. A Micro Electro-Mechanical System (MEMS) acceleration sensing device, comprising:

a sensing element suspended for rotational motion about a single rotational axis; and a pair of substantially planar substrates spaced on opposite sides of the sensing element, each of the substrates having first and second electrodes arranged in side-by-side patterns along a longitudinal axis of the sensing element that is oriented substantially perpendicular to the single rotational axis such that at least a portion of each of the first and second electrodes are positioned at substantially identical distances from the single rotational axis.

11. The device of claim 10 wherein one or both of the first and second electrodes further comprises a plurality of electrodes arranged in the elongated patterns that are extended perpendicular to the single rotational axis.

12. The device of claim 10 wherein the first and second electrodes are arranged in substantially contiguous first and second patterns.

13. The device of claim 10 wherein the first and second electrodes are arranged in relatively staggered first and second side-by-side patterns relative to the single rotational axis.

14. The device of claim 10 wherein a surface of each substrate facing toward the sensing element further comprises a three-dimensional structure with the first and second electrodes being spaced on the structure with lesser and greater distances from the sensing element.

15. The device of claim 14 wherein the three-dimensional structure of each substrate further comprises a surface portion positioned opposite from a portion of the sensing element distal from the single rotational axis and being spaced at a greater distance from the sensing element than one of the first and second electrodes.

16. The device of claim 15 wherein the surface portion of the substrate corresponding to a distal portion of the sensing element further comprises a surface portion that is substantially coplanar with the structure spaced at the greater distance from the sensing element.

17. The device of claim 15 wherein the surface portion of the substrate corresponding to a distal portion of the sensing element further comprises a surface portion that is inclined away from the sensing element.

18. The device of claim 15 wherein the surface portion of the substrate positioned opposite from a distal portion of the sensing element further comprises a surface portion that is spaced at a greater distance from the sensing element than both of the first and second electrodes.

19. The device of claim 14 wherein a portion of each substrate positioned opposite from a portion of the sensing element distal from the rotational axis is truncated from the three-dimensional structure of each substrate.

20. A Micro Electro-Mechanical System (MEMS) capacitive acceleration sensing device, comprising:

a sensing element having first and second substantially planar and parallel spaced apart opposing surfaces and being suspended for pendulous motion about a single rotational axis oriented along a first axis of the sensing element;

one or more substantially planar substrates each having a face spaced away from one of the opposing surfaces of the sensing element; and first and second pluralities of electrodes arranged lengthwise along the face of each substrate in elongated patterns that are oriented substantially perpendicular to the rotational axis of the sensing element such that at least a portion of each of the first and second pluralities of electrodes simultaneously experience substantially identical relative separation distances from the sensing element during rotational excursions of the sensing element about the rotational axis in which the sensing element both approaches and withdraws from the face of at least one of the substrates.

21. A Micro Electro-Mechanical System (MEMS) capacitive acceleration sensing device, comprising:

a sensing element having first and second substantially planar and parallel spaced apart opposing surfaces and being suspended for pendulous motion about a hinge axis oriented along a shorter axis of the sensing element; and one or more substantially planar substrates each having a face spaced away from one of the opposing surfaces of the sensing element, the face of each of the one or more substrates further comprising a three-dimensional structure having substantially planar and parallel trough and mesa surfaces oriented crosswise to the hinge axis of the sensing element, the trough surface being spaced more distantly than the mesa surface from the surface of the sensing element, and each of the substrates having first and second pluralities of electrodes arranged respectively on the trough and mesa surfaces in elongated patterns oriented substantially crosswise to the hinge axis of the sensing element and forming respective first and second capacitors with the sensing element.

22. The acceleration sensing device of claim 21 wherein the trough surfaces further comprise a pair of substantially coplanar trough surfaces arranged symmetrically on opposite sides of a single mesa surface.

23. The acceleration sensing device of claim 21 wherein the mesa surfaces further comprise a pair of substantially coplanar mesa surfaces arranged symmetrically on opposite sides of a single trough surface.

24. The acceleration sensing device of claim 21 wherein the face of each of the substrates further comprises a clearance relief surface positioned opposite from a moveable portion of the sensing element remote from the hinge axis, the clearance relief surface being substantially coplanar with and interconnected with the trough surface and sized to clear the moveable portion of the sensing element.

25. The acceleration sensing device of claim 21 wherein the face of each of the substrates further comprises a clearance relief surface positioned opposite from a moveable portion of the sensing element remote from the hinge axis, the clearance relief surface being spaced more distantly than the trough and mesa surfaces from the surface of the sensing element and being sized to clear the moveable portion of the sensing element.

26. The acceleration sensing device of claim 21 wherein the face of each of the substrates further comprises a clearance relief surface positioned opposite from a moveable portion of the sensing element remote from the hinge axis, the clearance relief surface being inclined away from the surface of the sensing element and being sized to clear the moveable portion of the sensing element.

27. The acceleration sensing device of claim 21 wherein a portion of each of the substrates is truncated in an area positioned opposite from a moveable portion of the sensing element remote from the hinge axis, the truncated portion being sized to clear the moveable portion of the sensing element.

* * * * *